Jan. 5, 1926. 1,568,351
H. TAYLOR
TIRE CARRIER
Filed June 14, 1922 2 Sheets-Sheet 2

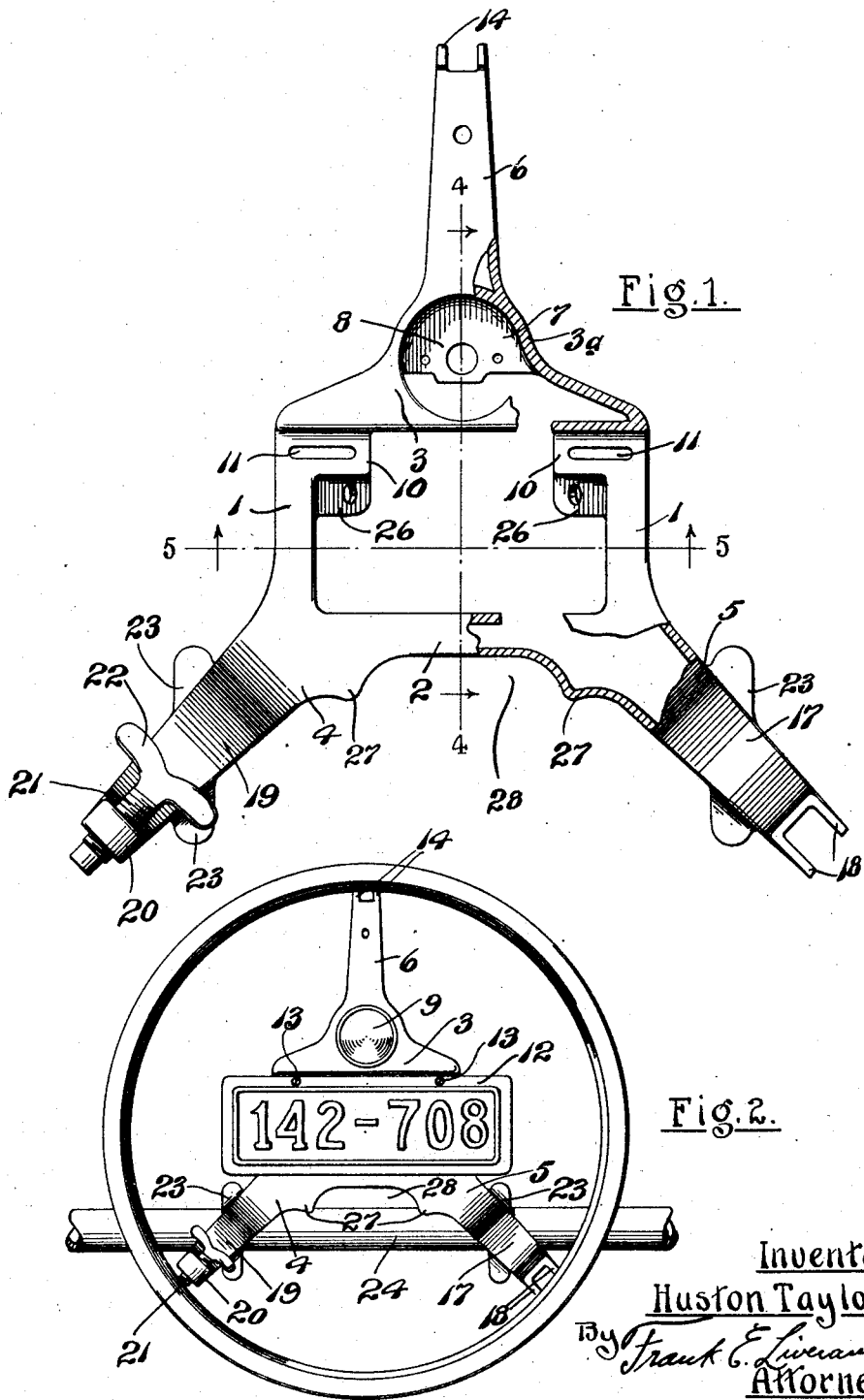

Inventor
Huston Taylor
By Frank E. Liverance, Jr.
Attorney

Patented Jan. 5, 1926.

1,568,351

UNITED STATES PATENT OFFICE.

HUSTON TAYLOR, OF DETROIT, MICHIGAN, ASSIGNOR TO BRENNAN-TAYLOR CORPORATION, OF DETROIT, MICHIGAN, A CORPORATION OF MICHIGAN.

TIRE CARRIER.

Application filed June 14, 1922. Serial No. 568,112.

*To all whom it may concern:*

Be it known that I, HUSTON TAYLOR, a citizen of the United States of America, residing at Detroit, in the county of Wayne and State of Michigan, have invented certain new and useful Improvements in Tire Carriers; and I do hereby declare the following to be a full, clear, and exact description of the invention, such as will enable others skilled in the art to which it appertains to make and use the same.

This invention relates to a carrier for spare rims or rims with tires attached such as are usually a part of the equipment of automobiles: It is a primary object and purpose of the present invention to make a carrier of this type which in addition to carrying the spare rim or rim and tire, is equipped with means for the attachment of a rear light and the regulation license plate adjacent the light, both being located centrally of the rim carried on the carrier, and the rim carrying arms extending radially from the central structure on which the light and license plate are attached. A further object of the invention is to make a carrier of this character of simple construction, there being but one main part formed as one casting with two clamping members for attachment of the same to an automobile and a single securing device for securing the tire rim on the carrier, the construction as a whole being simple and relatively inexpensive to manufacture and the device serving as a particularly effective means for carrying spare rims without danger of loss thereof. Further objects and purposes than those stated will appear as understanding of the invention is had from the following description, taken in connection with the accompanying drawings, in which, Fig. 1 is an elevation with parts broken away and in section, of my new tire carrier construction.

Fig. 2 is a like view in elevation showing a rim, license plate and light connected thereto.

Like reference characters refer to like parts in the several figures of the drawings.

Figure 3:
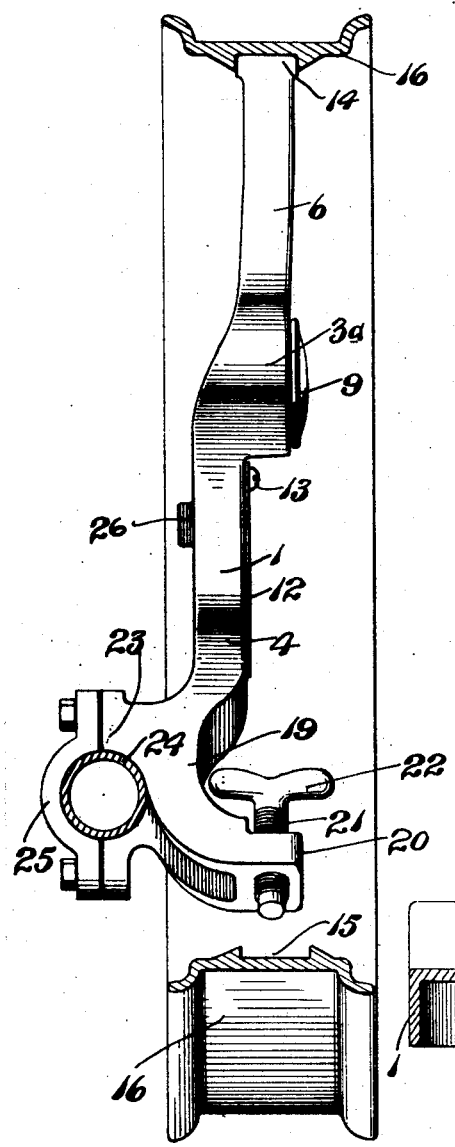
Fig. 3 is a side elevation of the carrier, the rim thereon being broken away and in section for disclosure of the carrier.
Figure 4:
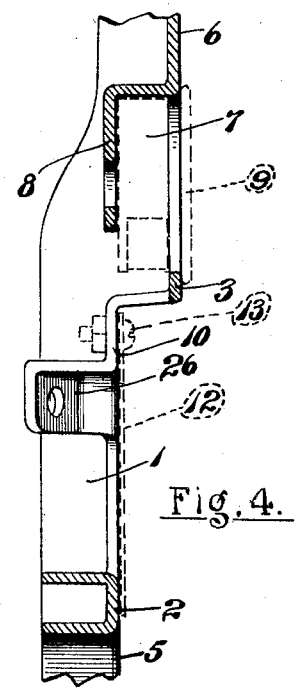
Fig. 4 is a fragmentary vertical section on the plane of line 4—4, of Fig. 1, looking in the direction indicated by the arrows.
Figure 5:
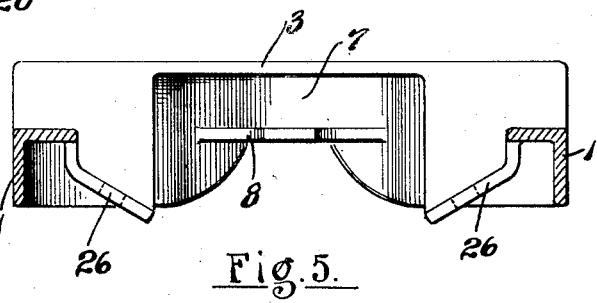
Fig. 5 is a horizontal section on the plane of line 5—5, of Fig. 1, looking upwardly as indicated.

In the construction of the carrier, a central member, is provided substantially in the shape of a rectangular open frame, having vertical sides 1, a lower side 2 and an upper side 3, said latter side projecting to overhang the lower portion of the central member and being centrally enlarged as indicated at $3^a$ for a purpose later appearing. Arms 4 and 5 extend downwardly and outwardly from the lower corners of said central member and a third arm 6 extends upwardly from the upper side of the enlarged portion $3^a$ of the upper member of the central frame. These arms extend substantially radially from a common center and the tire rim is to be placed around the outer ends of the same.

The enlarged portion $3^a$, heretofore described has a recess made in an outer side, indicated at 7, a transverse backing plate 8 extending partly across the same against which the tail light 9 is placed in said recess and to which it is permanently secured. The carrier at the upper end portions of the sides 1 is widened for a distance, as at 10, and horizontal slots 11 are made therein. A license plate 12 may be placed over the central member, as shown in Fig. 2, the usual securing bolts 13 passing therethrough and through the said slots. The plate directly under the light is illuminated thereby at night in the usual manner. The opening made in the central member lightens the construction and in practice is wholly covered by the license plate. (See Fig. 2.)

At the upper end of the arm 6, the sides are widened so as to fit the groove in a rim. These widened portions 14 freely enter the groove 15 in the rim 16 but are wide enough that little or no play or lost motion is permitted. The arm 5 adjacent its lower end is curved inwardly as indicated at 17 and then back, the ends of the sides of the arm at its end being formed with parts 18 similar to parts 14 to enter the groove 15 in like manner. Similarly, the arm 4 adjacent its lower end portion is inwardly curved, as at 19 and then extended outwardly to make an end 20 which comes over the inner side of the rim. A screw 21 is threaded through the end 20, its outer end being adapted to enter groove 15. The inner end of the screw is formed with an integral handle 22 for manual operation of the screw and the inward bend of the arm allows room for the operation of the screw by said handle. The inward bend in arm 5 has no functional importance so far as the operation of any securing device is concerned but balances the carrier and makes the appearance symmetrical. Both bends, however have lugs 23 formed integrally therewith on their inner sides, as indicated at 23, each having a concave recess for the reception of a tubular cross bar 24 which is standard construction on many motor vehicles, the carrier as a whole being clamped to said cross bar by means of yokes 25 and cap screws passing therethrough into the upper and lower portions of the lugs 23, as shown in Fig. 3.

Below the widened upper portions 10 of the sides 1 of the central member of the carrier lugs 26 may be formed integral with the main member of the carrier, the same extending diagonally inwardly as shown and having openings therethrough for the passage of bolts for securing the carrier to any suitable support for the carrier, said support being permanently carried by the body of the automobile. In addition, the arms 4 and 5, adjacent their upper ends and on their inner sides may be formed with projections 27, more or less defining a recess 28 below the side 2 in which the well known stop signal now widely used may be seated if desired when the automobile is equipped with one.

The main member of the carrier is a single integral casting easily produced from a pattern. The arms are channel shaped in cross section for strength and lightness, as also are the sides 1, 2 and 3 of the central member. The construction is light, strong and compact. Rims are held thereon securely without danger of loss. The operation of securing or removing the rim is very simple and effective. In every way the construction is practical and effective to serve the ends desired.

I claim:

1. A device of the class described, comprising a central member, a plurality of arms extending therefrom in different directions, one of said arms having an inwardly bent portion terminating in an outwardly projecting end, a screw member threaded through said end to engage with a tire rim, a handle on the inner end of the screw member operable in the recess made by said inwardly bent portion of the arm, and means on the outer ends of the other arms to engage with the tire rim, substantially as described.

2. A device of the class described, comprising a central open member having substantially parallel vertical sides and parallel upper and lower sides, the upper side overhanging the remainder of the member, and said vertical sides having inwardly extending portions formed with longitudinal slots therein, a plurality of arms extending from the central member in different directions, and means at the outer ends of the arms for detachably securing a tire rim thereto and around the device.

3. A tire carrier comprising a plurality of connected radiating arms, one of said arms having an inwardly bent portion near its end terminating in an outwardly extending end portion, means adjustably passing through said end portion of the arm, at its outer end adapted to engage with a tire rim, handle means at the inner end of said adjustable means for operating the same, and means at the outer ends of the other arms to engage with the tire rim, substantially as described.

In testimony whereof I affix my signature.

HUSTON TAYLOR.